Patented Apr. 10, 1934

1,954,615

UNITED STATES PATENT OFFICE 1,954,615

ANTIMONY DERIVATIVE OF SULPHARSPHENAMINE

Walter G. Christiansen, Bloomfield, N. J., and Alfred E. Jurist, Brooklyn, N. Y., assignors to E. R. Squibb & Sons, Brooklyn, N. Y., a corporation of New York No Drawing. Application May 11, 1931, Serial No. 536,663

8 Claims. (Cl. 260—11)

The compounds to which the invention relates are antimony derivatives of sulpharsphenamine. Such antimony derivatives of sulpharsphenamine (sodium 3,3'-diamino-4,4'-dihydroxy-arsenobenzene-N,N'-methylene sulphinate) can be prepared by combining therewith a suitable organic antimony salt, for example, sodium antimonyl tartrate.

The antimony derivatives of sulpharsphenamine prepared in accordance with the invention are powders of a pale buff tint readily water soluble and adapted for intravenous injection without further alkalinization. The products contain from 10–12% of antimony and from 13–15% of arsenic, and have been found to be particularly effective in the treatment of spirochete infections.

As an example of the method of preparing the products, 60 grams of sodium antimonyl tartrate are dissolved in 300 cc. of water. This solution is then mixed with a solution of 100 grams of sulpharsphenamine (sodium 3,3'-diamino-4,4'-dihydroxy-arsenobenzene-N,N'-methylene sulphinate) in 900 cc. of water. The clear solution is then poured into seven volumes of ethyl alcohol to precipitate the antimony derivative of sulpharsphenamine. The precipitate is collected on a Buchner funnel, washed with alcohol and dried in a vacuum.

It is to be understood that the proportions mentioned in the foregoing example are not essential, and that other proportions may be utilized to produce the desired products. Furthermore, although sodium antimony tartrate is preferred as the organic antimony salt in the reaction, other organic salts of antimony and particularly the alkali metal and other antimonyl tartrates, citrates, malates and lactates may also be used.

We claim:

1. Antimony-sulpharsphenamine.
2. The water soluble interaction-product of an antimony salt of an hydroxy aliphatic acid and an arsphenamine.
3. The water soluble interaction-product of an antimony salt of an hydroxy aliphatic acid and sulpharsphenamine.
4. The interaction-product of sodium antimony tartrate and sulpharsphenamine producible in water solution.
5. The method of preparing an antimony-arsphenamine that comprises interacting an antimony salt of an hydroxy aliphatic acid and an arsphenamine in water solution.
6. The method of preparing antimony-sulpharsphenamine that comprises interacting an antimony salt of an hydroxy aliphatic acid and sulpharsphenamine in water solution.
7. The method of preparing antimony-sulpharsphenamine that comprises interacting sodium antimony tartrate and sulpharsphenamine in water solution.
8. The water soluble interaction-product of sodium antimony tartrate and sulpharsphenamine containing 10–12% of antimony and 13 to 15% of arsenic producible from sodium antimony tartrate and sulpharsphenamine in water solution.

WALTER G. CHRISTIANSEN.
ALFRED E. JURIST.